United States Patent
Jana et al.

(10) Patent No.: US 10,515,383 B2
(45) Date of Patent: Dec. 24, 2019

(54) REDUCING COMPUTATIONAL RESOURCE REQUIREMENTS FOR MAKING PAYMENTS

(71) Applicant: MASTERCARD INTERNATIONAL INCORPORATED, Purchase, NY (US)

(72) Inventors: Nandkishore Jana, Deccan gold society (IN); Ramya Kumpaty, Pune (IN); Krunali Shah, Pune (IN); Ravinder Wadhwa, Pune (IN); Ravi Pareek, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 343 days.

(21) Appl. No.: 15/405,713

(22) Filed: Jan. 13, 2017

(65) Prior Publication Data
US 2017/0206542 A1   Jul. 20, 2017

(30) Foreign Application Priority Data
Jan. 15, 2016  (SG) .......................... 10201600328V (51) Int. Cl.
| G06Q 20/00 | (2012.01) |
| G06Q 30/02 | (2012.01) |
| G06Q 20/22 | (2012.01) |
| G06Q 20/02 | (2012.01) |

(52) U.S. Cl.
CPC ......... *G06Q 30/0215* (2013.01); *G06Q 20/02* (2013.01); *G06Q 20/223* (2013.01)

(58) Field of Classification Search
CPC .................................................. G06Q 30/0215
See application file for complete search history.

(56) References Cited

U.S. PATENT DOCUMENTS

| 8,515,910 | B1 | 8/2013 | Certain et al. |
| 8,527,405 | B1* | 9/2013 | Das .................... G06Q 30/0215 705/39 |
| 9,443,268 | B1* | 9/2016 | Kapczynski ......... G06Q 40/025 |
| 2001/0049618 | A1* | 12/2001 | Patzel ................... G06Q 10/06 705/400 |
| 2003/0105725 | A1* | 6/2003 | Hoffman ................ G06F 21/32 705/75 |
| 2007/0208638 | A1* | 9/2007 | Brown .................. G06Q 40/00 705/35 |
| 2008/0249934 | A1* | 10/2008 | Purchase ................ G06Q 20/02 705/40 |

(Continued)

Primary Examiner — Bennett M Sigmond
Assistant Examiner — Scott C Anderson
(74) Attorney, Agent, or Firm — Harness, Dickey & Pierce, P.L.C.

(57) ABSTRACT

A peer-to-peer (P2P) payment system is proposed in which a server computationally analyses historical data relating to P2P traffic to predict periods of high usage, and, based on the predicted high usage periods, computationally interacts with payment senders, to schedule payments to avoid the predicted high usage periods. The effect of this is to smooth the traffic over time, thereby reducing the number of transfers which are required at peak traffic periods. In this way, the resource requirements of operating the P2P process can be reduced, since the peak level of P2P traffic, which determines the computational resources which have to be devoted to the P2P traffic, can be reduced.

17 Claims, 6 Drawing Sheets

(56) References Cited

U.S. PATENT DOCUMENTS

| | | | |
|---|---|---|---|
| 2009/0046583 A1* | 2/2009 | Towster | H04L 41/0896 370/232 |
| 2012/0005597 A1 | 1/2012 | Eberlein | |
| 2013/0018785 A1* | 1/2013 | Dolphin | G06Q 20/10 705/40 |
| 2013/0036000 A1 | 2/2013 | Giordano et al. | |
| 2013/0325707 A1* | 12/2013 | Joa | G06Q 40/02 705/40 |
| 2015/0220962 A1* | 8/2015 | Carder | G06Q 30/0235 705/14.35 |
| 2016/0379116 A1* | 12/2016 | Lottini | G06N 5/003 706/46 |

* cited by examiner

REDUCING COMPUTATIONAL RESOURCE REQUIREMENTS FOR MAKING PAYMENTS

CROSS-REFERENCE TO RELATED APPLICATION

This application claims the benefit of and priority to Singapore Patent Application No. 10201600328V, filed Jan. 15, 2016. The entire disclosure of the above application is incorporated herein by reference.

FIELD

The present disclosure relates to methods and systems for performing payments from senders to recipients, and in particular to methods and systems which permit more efficient usage of computational resources.

BACKGROUND

This section provides background information related to the present disclosure which is not necessarily prior art.

Peer-to-peer payment (P2P payment, also called person-to-person payment) is an online technology that allows a "sender" to transfer funds from a payment account associated with the sender, to a payment account associated with a payment "recipient" via the Internet or a mobile phone. The sender may, for example, be a customer of a recipient who is a merchant. Typically, neither the sender nor the recipient has to trust the other with information about his or her payment account.

There are two conventional methods for initiating a P2P payment. In the first method, the sender and payee establish secure accounts with a trusted third-party vendor (typically, a financial institution), designating their respective bank account or credit card information to be used to transfer and accept funds. Using the third party's website or a mobile application, the sender and recipient can complete the process of sending or receiving funds. The sender can only send funds to someone who is a member of the network.

In the second method, the sender uses an online interface or mobile application (typically provided by his or her bank or another financial institution) to contact a third party site. To initiate the transfer, the sender indicates the amount of funds to be transferred, and provides contact data for the payee (an email address or phone number). Once the transfer has been initiated by the sender, the recipient receives a notification using the contact data. The recipient uses the online interface or mobile application to input his or her payment account information (e.g. the number of a payment account held by a bank, and details of the bank) to accept the transfer of funds. In this second method, recipients do not need to have a payment account with the same financial institution as the sender in order to receive a money transfer.

As P2P traffic grows, the computational infrastructure required to implement it is becoming increasingly expensive and complex.

SUMMARY

This section provides a general summary of the disclosure, and is not a comprehensive disclosure of its full scope or all of its features. Aspects and embodiments of the disclosure are also set out in the accompanying claims.

The present disclosure aims to provide new and useful systems and methods for making a payment which address the problems of conventional systems and methods noted above.

In general terms, the disclosure proposes that a P2P system computationally analyses historical data relating to P2P traffic to predict periods of high usage, and, based on the predicted high usage periods, computationally interacts with payment senders, to schedule payments to avoid the predicted high usage periods.

The effect of this is to smooth the traffic over time, thereby reducing the number of transfers which are required at peak traffic periods. In this way, the computational expenses of operating the P2P process can be reduced, since the peak level of P2P traffic, which determines the computational resources which have to be devoted to the P2P traffic, can be reduced.

The operator of the P2P process provides incentives ("rewards") to payment senders who agree to their corresponding payments being performed at a time other than the predicted high usage periods. Thus, these payment senders receive a benefit.

Furthermore, other payment senders who insist on their payment being performed at a high usage period, may benefit, since if the volume of traffic at those periods is reduced, the quality of service of the payment process may be improved (e.g. the risk of the payment system becoming overloaded is reduced). Thus, payment senders who co-operate with the proposed payment scheduling, and payment senders who do not participate, both benefit. This in turn leads to greater levels of satisfaction by both types of payment senders, which would be expected to lead to improved business for the payment recipients.

The scheduling process comprises defining a plurality of time-slots (which may be thought of as "buckets") during a single day. For each time-slot, a corresponding estimate is made of the volume of payments during the time-slot (i.e. the estimated workload of the payment engine during that time-slot). The scheduling process then recommends to senders that the payment be scheduled during a time-slot other than the time-slot with the highest volume of payments.

For at least one of the time-slots, a corresponding incentive ("reward") is defined. If this is done for a plurality of the time-slots, those time-slots having lower workload estimates may have correspondingly higher rewards. During the interaction with the senders, the senders are offered the option for the money to be transferred to the recipient during one of the time-slots for which a reward has been defined, and may be informed about the amount of the reward associated with each of those time-slots. The sender may choose one of these time slots. When a time-slot choice is received from the senders, the payment to the recipient's payment account is scheduled during the chosen time-slot.

The sender is given the reward corresponding to the chosen time-slot. The reward may, for example, be in the form of a discount to a standard service charge for making the payment (if so, the reward will typically be applied when the payment is debited to the sender's payment account, which may be earlier than the chosen time slot). Alternatively, the reward may be one or more reward points of a rewards program, or a cash-back payment (e.g. which may be used to cover some or all of the cost of making a future peer-to-peer payment using the system). In the latter cases, the reward may be made when or after the transfer is made to the recipient's account.

The disclosure may be expressed as a method carried out by the server. Alternatively, it may be expressed as the server itself, or as a network of communicating devices (a "computerized network") comprising the server. It may further be expressed in terms of a software application downloadable into a computer device to facilitate the method. The software application is a computer program product, which may be stored in non-transitory form on a tangible data-storage device (such as a storage device of a server, or one within a communication device).

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. With that said, an embodiment of the disclosure will now be described for the sake of example only with reference to the following drawings, in which.

Corresponding reference numerals generally indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Figure 1:
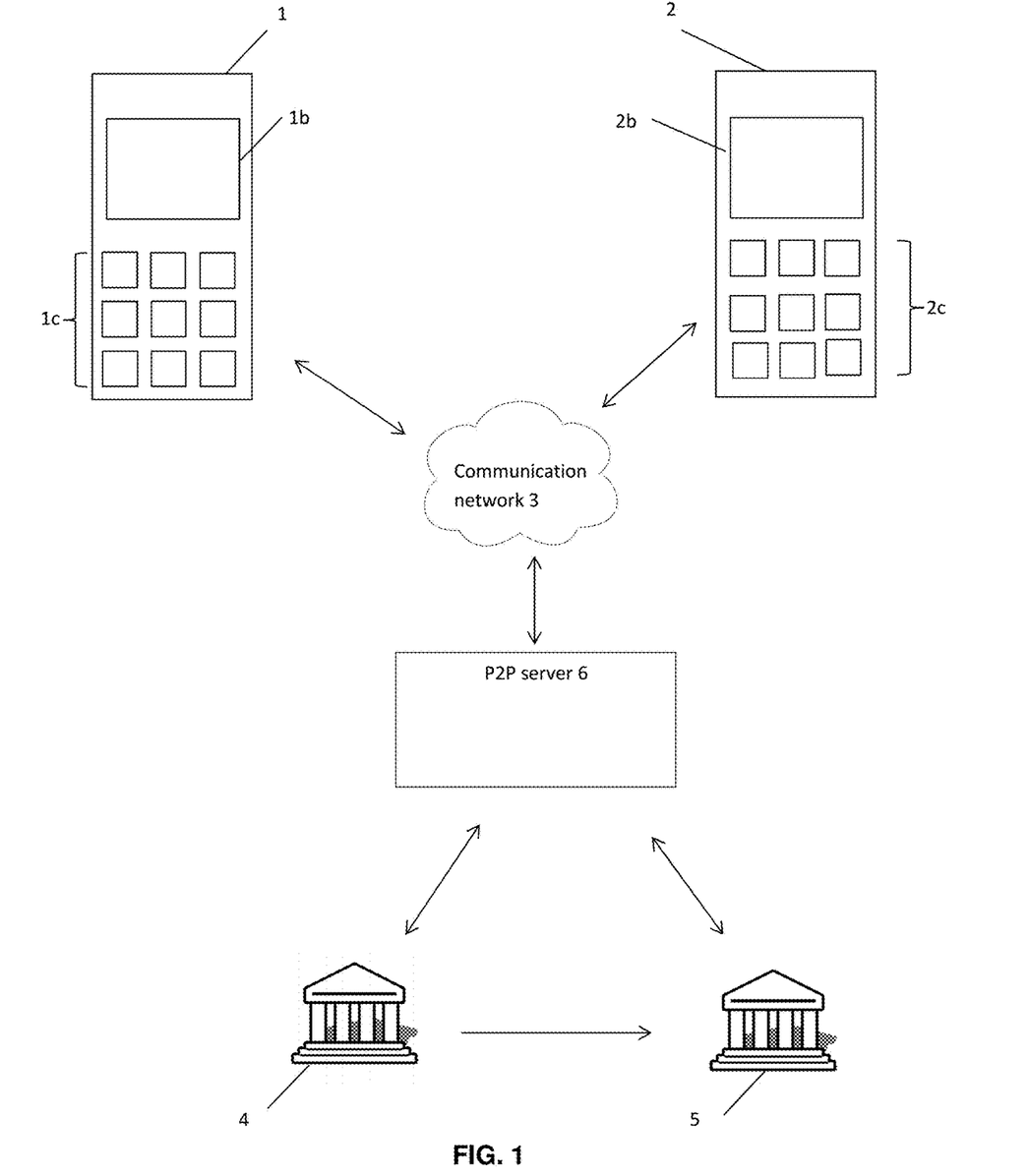
FIG. 1 shows schematically a computerized network of electronic devices for performing a method which is a first embodiment of the disclosure, the network including servers and communication devices.

Referring to FIG. 1, a computerized network of devices is shown which cooperate together to perform a method according to the disclosure. A first communication device 1 is associated with a person who wishes to make a payment (the payment "sender"). A second communication device 2 is associated with the person (the payment "recipient") to whom the sender wishes to make the payment. For simplicity the communication devices for just one sender and one recipient are shown, but it is to be understood that in reality there may be many senders who at any time desire to send payments to corresponding recipients.

The communication devices 1, 2 (which are described below in more detail with reference to FIG. 6) include a respective screen 1b, 2b and keys 1c, 2c. The screen 1b may be touch sensitive, in which case the screen 1b and keys 1c together provide a user interface of the communication device 1. Both the communication devices 1, 2 are able to communicate with a communication network 3 using respective communication interfaces (not shown) of the communication devices 1, 2.

In FIG. 1, the communication devices 1, 2 are depicted as smartphones, however they may be any electronic communication device, such as another mobile device (e.g. a tablet computer) or a personal computer (PC). The communication devices 1, 2 may communicate with the communication network 3 via a wireless connection (e.g. 3G, 4G, WiFi or Bluetooth) or a wired connection.

The sender associated with the communication device 1 maintains a payment account (e.g. a bank account or a credit card account) at a financial institution (e.g. bank), referred to here as the issuer, and associated with an issuer server 4. The recipient associated with the communication device 2 maintains a payment account at a financial institution (e.g. bank), referred to here as the acquirer, and associated with an acquirer server 5. The issuer server 4 and acquirer server 5 are controlled by a P2P server 6 to make payments between the payment accounts they hold. The communication devices 1, 2 can communicate with the P2P server 6 using the communication network 3.

Figure 2:
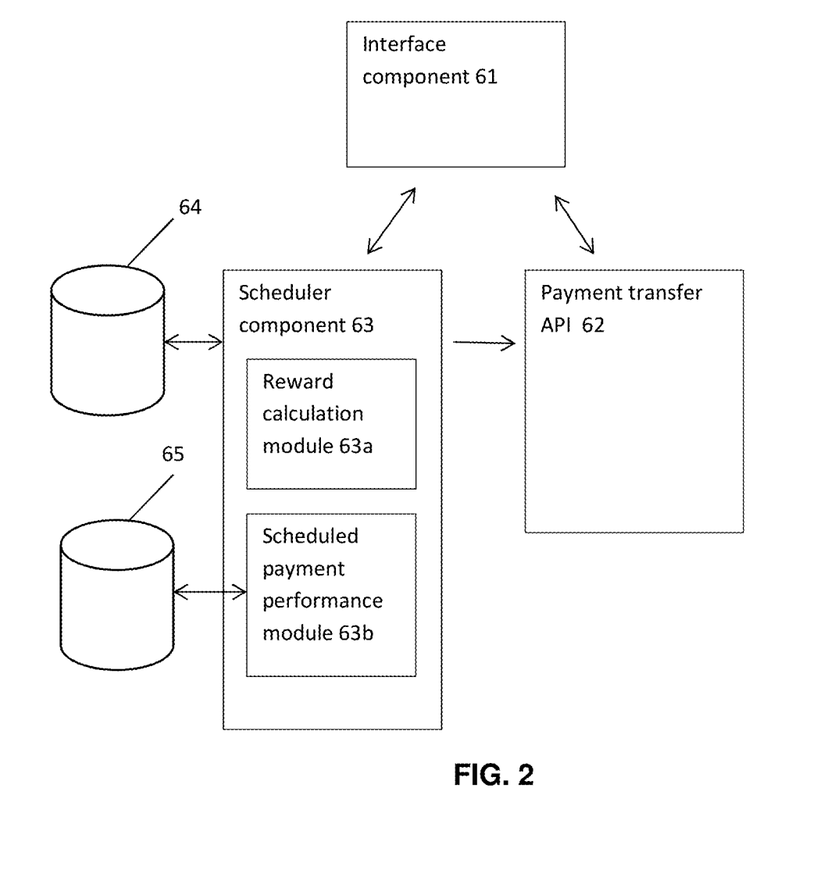
FIG. 2 shows the logical structure of the software of a P2P server of the system of FIG. 1.

FIG. 2 shows the logical structure of the software running on the P2P server 6. It includes a component 61 for interfacing with the sender and recipient communication devices 1, 2: a payment transfer API 62 for performing a P2P payment; and a scheduler component 63. The scheduler component 63 has access to a database 64 of data describing historical P2P payment transactions. The scheduler component 63 comprises two modules: a reward calculation module 63a for calculating rewards associated with each of a number of time-slots, and a scheduled payment performance module 63b for performing payments according to a schedule determined by corresponding senders. The scheduled payment performance module 63b employs a database 65 of scheduled payments, as explained below.

The function of these three components will now be explained with reference to FIG. 3, which shows the overall method 100 carried out by the computerized network of FIG. 1 to perform a single payment operation, and FIG. 4 which shows the process 200 carried out by the reward calculation module 63a of the scheduler component 63.

Figure 3:
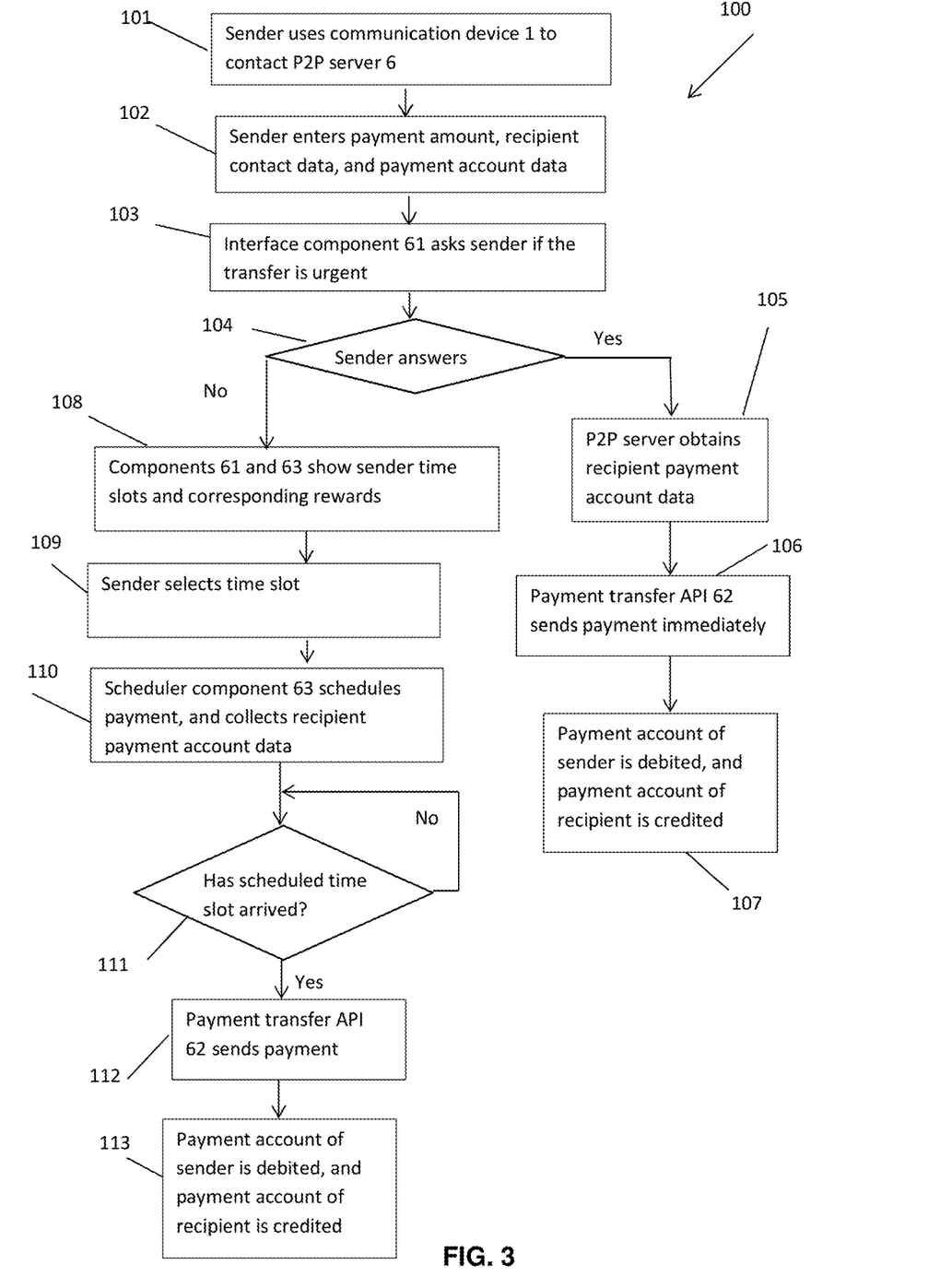
FIG. 3 shows a method of performing a payment transaction by the computerized network of FIG. 1.

Referring firstly to FIG. 3, steps 101 and 102 are the same as in some conventional P2P payment methods.

In step 101, the sender uses the communication device 1 to communicate with the P2P payment server 6. This may be done by the sender using a standard browser running on the communication device 1, or it may be done using a software application, such as one previously downloaded from the payment server 6 or the issuer 4.

In either case, a graphical user interface (GUI) is presented to the sender, under the control of the component 61. If the sender is using a standard browser running on the communication device 1, the component 61 provides instructions (for example in HTML or XML) to control the GUI seen by the sender. If the sender is using a dedicated software application running on the communication device 1, the component 61 interfaces with and controls the software application. The component 61 may be implemented in the same way as a corresponding component of a conventional P2P server.

In step 102, the sender enters into the GUI a payment amount, recipient data, and payment account data relating to the sender's account at the issuer.

The recipient data may be recipient contact data, which the P2P server 6 can use to contact the recipient (see steps 105, 110 below). Alternatively, the recipient data may be data which allows the P2P server 6 to access a database of previously stored recipient data. For example, the P2P server 6 may store, for each of a number of previous senders, a database of all the recipients to whom the sender has previously sent money, and the GUI may present those options to the sender. In this case, the recipient data may be just a selection of one of the options.

The payment account data is data sufficient to identify the issuer (e.g. an issuer name and/or an issuer identity number), and sufficient to identify to (at least to the issuer server 4) the identity of the sender. For example, the payment account data may be a PAN (payment account number) number relating to a payment card issued by the issuer (optionally together with card expiry data, card verification value (CVC) number, etc.). As used in this document, the term "payment card" refers to any cashless payment device associated with a payment account, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, transponder devices, NFC-enabled devices, and/or computers.

In another alternative, the payment account data may be a name or identity number of the issuer, and the number of the sender's payment account.

In a further alternative, the payment account data may be a name or identity number of the issuer, plus a token issued by the issuer by which the issuer is able to access a database of client records to identify the sender's payment account.

In step 103, the interface component 61 uses the GUI to ask the sender if the transfer is an urgent one.

If, in step 104, the sender answers positively ("Yes"), then in step 105 the interface component 61 obtains recipient payment account data identifying the payment account of the recipient. Specifically, if in step 102, the sender entered contact data for the recipient, then the interface component 61 may perform step 105 by using the contact data to send a notification to the recipient that a payment is being sent to him or her (optionally telling him or her also the amount). The contact data may be associated with the communication device 2 (e.g. a phone number of the communication device 2, or an email address which the communication device is programmed to access). The recipient may then use the communication device 2 to contact the interface component 61 either via a browser or a dedicated software application running on the communication device 2. In either case, the recipient sees a GUI controlled by the interface component 61. Into it the recipient may enter recipient payment account data which is sufficient to identify the acquirer to the server 6, and sufficient to identify (at least to the acquirer server 5) the payment account of the recipient. Again, this may be a PAN number; a bank identifier name and/or identity number, and a bank account number; or a bank identifier name and/or identity number, and a token which will be recognised by the acquirer.

In a variation of the embodiment, if the sender has previously made a payment to the same recipient, the interface component 61 may have previously stored the recipient account data in a database assessable to the interface component 61. In this case, step 105 may be performed by obtaining the recipient account data from the database.

In step 106, the interface component 61 activates the payment transfer API 62 to send the payment, by communicating with the issuer server 4 and acquirer server 5. The exact flow of messages may vary from one implementation to another. In one case, the payment transfer API 62 may contact the acquirer server 5, which in turn contacts the issuer server 4 to request the payment. Alternatively, the payment transfer API 62 may contact the issuer server 4 to instruct it to make the payment to the acquirer 5.

In either case, the issuer server 4 performs various checks. These include an authorization operation (e.g. to check that sufficient funds are available in the sender's payment account), and optionally also a security operation (e.g. contacting the sender by SMS to the communication device 1, to obtain confirmation from the sender that the payment is intended). If either the security operation or the authorization operation are unsuccessful, the method terminates, and the payment transfer API 62 controls the interface component 61 to send a notification of this to the sender and/or the recipient. Alternatively, if the authorization operation and security operation are successful, the issuer server 4 arranges a payment to the acquirer 5. This may just be to schedule a payment in the future, e.g. as part of a clearing operation performed periodically. Without waiting for the clearing operation, the issuer server 4 debits the payment account of the sender (for the payment amount, plus optionally a sender service charge), and the acquirer server 5 credits the payment account of the recipient (for the payment amount, minus optionally a recipient service charge) (step 107). The payment from the sender's payment account to the recipient's payment account has now been completed (even though the clearing operation is still in the future).

The communication between the issuer server 4 and the acquirer server 5 may be a payment network (such as the one operated by MasterCard® Inc.). Optionally, the payment server 6 may be operated by the payment network, and in this case the P2P server 6 may have the dual role of communicating with the sender and recipient, and coordinating the communication between the issuer and acquirer.

Alternatively, if in step 104 the sender answers the payment is not urgent ("No"), then the interface component 61 activates a scheduler component 63 which is not present in a conventional P2P system.

In step 108 the scheduler component 63 controls the interface component 61 to present to the sender a number of time-slots in the future, and for each time-slot a corresponding reward for making the transfer into the recipient's payment account during the time-slot. A reward may, for example, be in the form of a reduced service charge for the transfer. Alternatively or additionally, it may be in the form of loyalty points or cash-back. The cash-back may be credited to an account held by the P2P server 6 and associated with the sender, rather than being credited to the sender's payment account with the issue. The sender may be able to use the cash-back to cover some or all of the cost of instructing future payments using the P2P server 6, thus incentivising the sender to use the P2P server 6 again.

The calculation of these rewards is performed by the reward calculation module 63a, and is explained below with reference to FIG. 4. For each time-slot presented to the sender, the reward may be high if the reward calculation module 63a estimates that the proportion of the current day's payments, which will be in that time-slot, is low.

Note that if at least part of the reward associated with a given time-slot is a reduction of the service charge (compared to the service charge which would be made if the payment is made urgently in step 106), then the display of the reward could be simply by displaying the resultant reduced service charge for each corresponding time-slot.

Note that the components 61 and 63 may not supply the sender with information about all time-slots with the immediate future. For example, there would be little value in presenting information about future time slots for which the expected level of payment traffic is higher than the current level (since it would make no sense to incentivize the sender to use those future time slots for the transfer). Optionally, the sender may only be given information about one or more of the future time slots, such as the ones having the lowest level of expected traffic. These future time slots are ones associated with rewards set by the reward calculation module 63a.

In step 109, the sender chooses one of the time-slots. Thus, if the sender chooses a time-slot for which it is estimated that a low proportion of the day's traffic will be in that time-slot, the sender will (in a later step of the method) be given a correspondingly high reward. Note that if only one time-slot is presented to the sender, the sender's confirmation that the presented time-slot is acceptable is equivalent to a choice of that time-slot. The sender may be given an option of rejecting all the presented time-slot(s), in which case the method jumps to step 106, and the payment is performed at once.

In step 110, the scheduled payment performance module 63b of the scheduler component 63 registers the selection, and schedules the payment into the recipient's payment account to be made during the chosen time-slot. It does this by entering a scheduled payment into the database 65. At this stage the scheduler component 63 may control the interface component 61 to perform an operation identical to that of step 106, of obtaining the recipient payment account data (e.g. by contacting the recipient using the contact data supplied in step 102).

In step 111, the scheduled payment performance module 63b accesses the database 65, and checks whether the chosen time-slot has arrived. If not, the scheduled payment performance module 63b waits until the next time-slot, and performs the same check again. When the result of the check is positive, the method proceeds to step 112.

In step 112, the scheduled payment performance module 63b instructs the payment transfer API 62 to perform the transfer in a way identical to step 106. In step 113, the payment account of the sender is debited, and the payment account of the recipient is credited, in the same way as in step 107. The sender is rewarded or charged according to the reward corresponding to the choice the sender made in step 109 (i.e., the reward which was displayed in step 108 in association with the chosen time-slot). The method then ends.

As noted above, method 100 shows what happens for each payment handled by the P2P server 6. It is to be understood that the P2P server 6 will typically be simultaneously performing method 100 for multiple payments, each having a corresponding server and recipient. In each time-slot, the scheduled payment performance module 63b will typically have to perform a large number of the scheduled payments, as well as a number of urgent ones.

Figure 4:
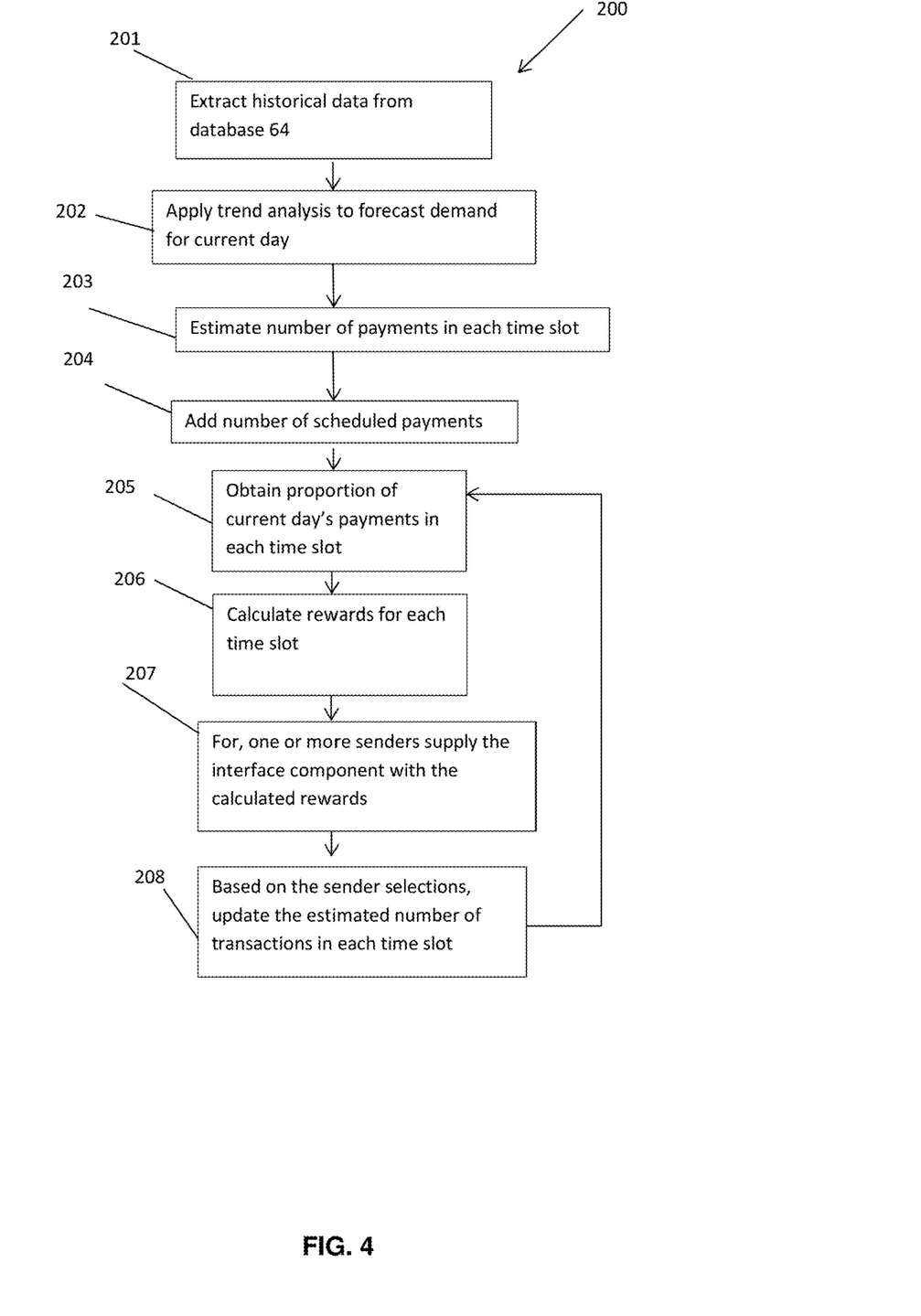
FIG. 4 shows a method performed by a module of the software of FIG. 2.

Turning to FIG. 4, the process 200 carried out by the reward calculation module 63a is explained. Conveniently, the process 200 may be initiated at intervals, for example once each 24 hour day, but the intervals may be longer or shorter. While the method 200 is performed once, the method 100 will typically be performed many times: once in respect of each payment which is received during the day. In other words, the process of method 200 is running in parallel with multiple instances of the method 100.

In step 201, the reward calculation module 63a extracts historical data from the database 64. In step 202, the reward calculation module 63a applies historical trend analysis to predict the number of transactions to be performed during a certain future time period. This will be the time period during which the scheduler component 63 schedules payment transfers during this performance of the method 200.

Conveniently, the future time period may also be a 24 hour day, but it may be longer or shorter than this. The trend analysis may, for example, be based on the current day of the week. The predicted number of transactions may, for example, be the average of the number of transactions on the corresponding day of the previous one or more weeks. Optionally, the predicted number of transactions may be corrected to take into account any trends in the data, such as a seasonal trend (for example, in the weeks before Christmas), or an annual trend (e.g. the rising number of people who participate in P2P transactions each year). Thus, the trend analysis may take into account any one or more of yearly data (e.g. number of transactions per year), monthly data (e.g. number of transactions in corresponding month of previous years) and daily data (e.g. number of transactions in previous days).

The future time period is divided into a plurality of time-slots (which may also be thought of as "buckets"). For the sake of simplicity, these time-slots are assumed below to be of the same length, but in some embodiments of the disclosure, this is not the case. In step 203, the scheduler forms an initial estimate of the number of transactions to be performed in each of the time-slots. In one example, these estimates may just be equal to the estimated total number of transactions during the future time period, divided by the number of time-slots in the future time period. However, depending on what historical data is available in the database 64, more sophisticated estimates are possible. For example, if the historical data indicates that payments are more likely at certain times of day, that fact can be taken into account in the initial estimate of the number of transactions to be performed in each of the time-slots.

If the future time period is longer than the periodicity with which the method 200 is carried out, then when the method 200 is initiated, the database 65 will already contain payments scheduled to occur during the future time period. In step 204, for each time-slot, the estimated number of payments in the respective time-slot is updated by adding to it a number of scheduled payments in that time-slot.

In step 205, using the updated estimated number of payments in each corresponding time-slot, the reward calculation module 63a estimates the respective proportion of the current day's payments which will be in that time-slot.

In step 206, using the respective estimated proportions of the current day's payments in each of the time-slots, the reward calculation module 63a assigns a respective reward to at least one of the time-slots.

For each such time-slot, the reward may be higher according to how low is the corresponding estimated proportion of the current day's payments within that time-slot. There are many ways in which this could be done. For example, there could be a number of predefined rewards, and the predefined rewards might have a predetermined ranking. Thus, the reward calculation module 63a could assign the predefined rewards to the time-slots (starting with the time-slot having the lowest predicted estimated proportion of the current day's payments) such that the order of the ranking of the predefined rewards was equal to the order of the estimated proportion of the number of payments in each of the time-slots.

Alternatively, the reward calculation module 63a could identify any of the future time slots for which the expected number of requests is lower than the current number of requests by more than a certain threshold, and assign an equal reward to each of those identified future time slots.

Note that if for all the future time slots the expected level of requests is higher than the current level of requests, the method may pass at once to step 105, so as to perform the transfer immediately.

Typically, during any given time-slot the P2P server will receive multiple payment requests, each having a corresponding sender and receiver. For each payment request, a respective instance of the method 100 would be performed. In each instance of step 108, the components 61 and 63 would present the corresponding sender with at least one of the possible time-slots, and, for each presented time-slot, display the corresponding reward which the reward calculation module 63a last assigned to that time-slot.

Once a certain number of payments have been scheduled in different instances of step 110, the risk reward calculation module 63a could be triggered (steps 207 and 208 of process 200) to update the estimated number of transactions in each of the timeslots. Then the method could return to step 205, and perform steps 205 and 206 again.

Figure 5:
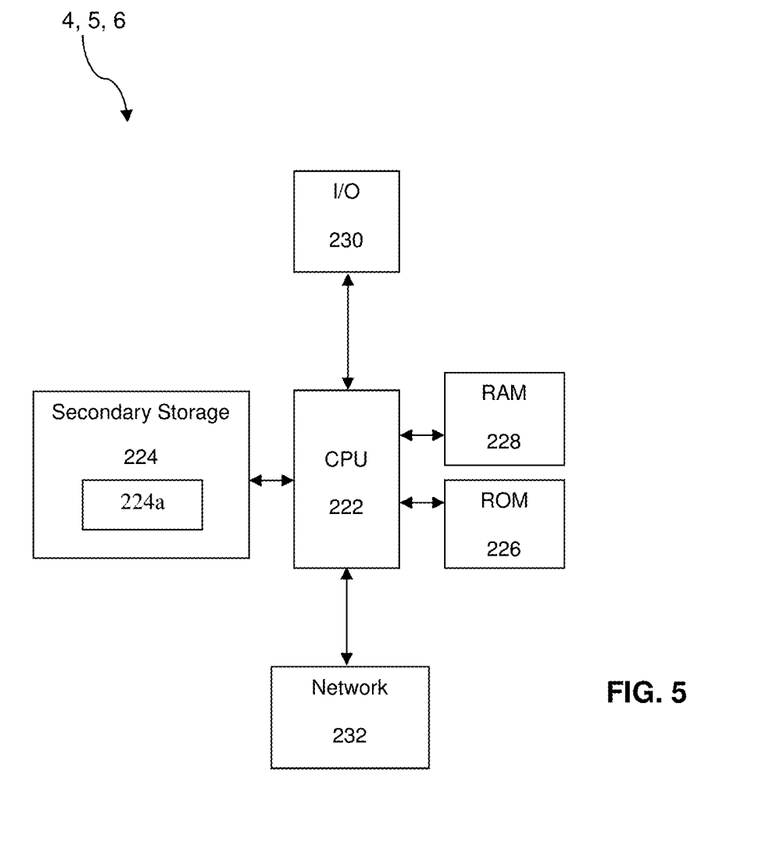
FIG. 5 is a block diagram of the technical architecture of the servers of FIG. 1.

FIG. 5 is a block diagram showing a technical architecture of the P2P server 6. The issuer server 4 or acquirer server 5 may also have this technical architecture.

The technical architecture includes a processor 222 (which may be referred to as a central processor unit or CPU) that is in communication with memory devices including secondary storage 224 (such as disk drives), read only memory (ROM) 226, random access memory (RAM) 228. The processor 222 may be implemented as one or more CPU chips. The technical architecture may further comprise input/output (I/O) devices 230, and network connectivity devices 232.

The secondary storage 224 is typically comprised of one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution.

In this embodiment, the secondary storage 224 has an order processing component 224a comprising non-transitory instructions operative by the processor 222 to perform various operations of the method of the present disclosure. The ROM 226 is used to store instructions and perhaps data which are read during program execution. The secondary storage 224, the RAM 228, and/or the ROM 226 may be referred to in some contexts as computer readable storage media and/or non-transitory computer readable media.

I/O devices 230 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols, such as code division multiple access (CDMA), global system for mobile communications (GSM), long-term evolution (LTE), worldwide interoperability for microwave access (Wi-MAX), near field communications (NFC), radio frequency identity (RFID), and/or other air interface protocol radio transceiver cards, and other well-known network devices. These network connectivity devices 232 may enable the processor 222 to communicate with the Internet or one or more intranets. With such a network connection, it is contemplated that the processor 222 might receive information from the network, or might output information to the network in the course of performing the above-described method operations. Such information, which is often represented as a sequence of instructions to be executed using processor 222, may be received from and outputted to the network, for example, in the form of a computer data signal embodied in a carrier wave.

The processor 222 executes instructions, codes, computer programs, scripts which it accesses from hard disk, floppy disk, optical disk (these various disk based systems may all be considered secondary storage 224), flash drive, ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture to provide the functionality of a number of servers that are not directly bound to the number of computers in the technical architecture. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 222, the RAM 228, and the ROM 226 are changed, transforming the technical architecture in part into a specific purpose machine or apparatus having the novel functionality taught by the present disclosure. It is fundamental to the electrical engineering and software engineering arts that functionality that can be implemented by loading executable software into a computer that can be converted to a hardware implementation by well-known design rules.

Figure 6:
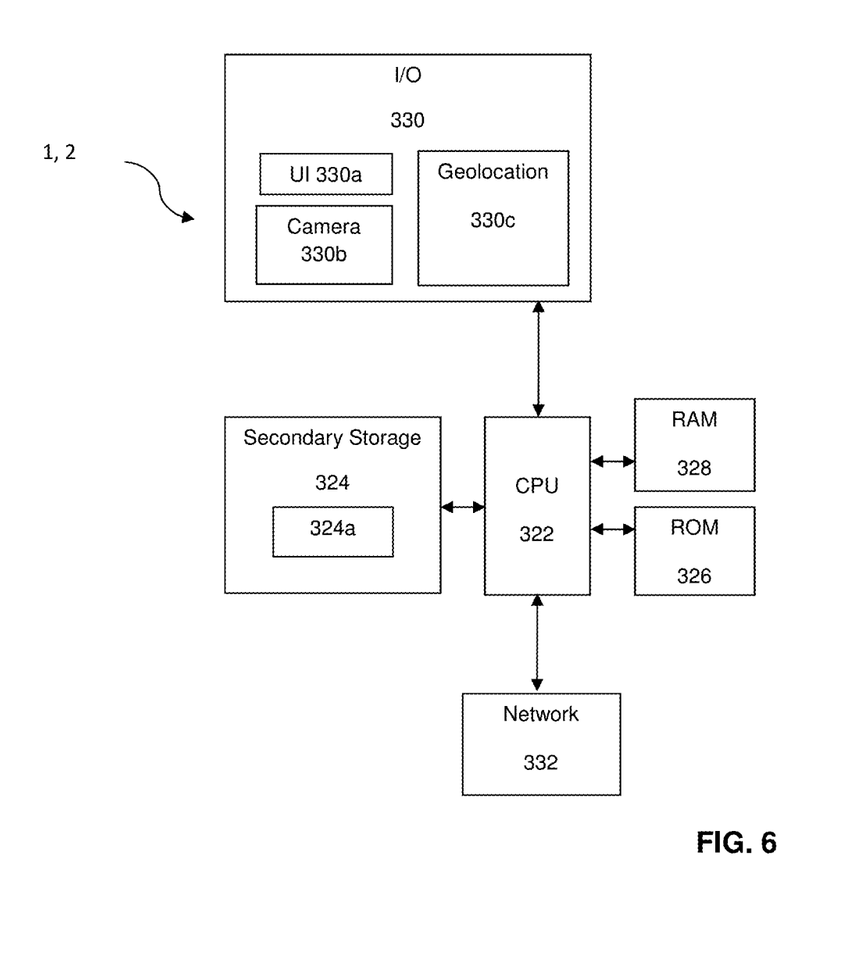
FIG. 6 is a block diagram of the communication devices of FIG. 1.

FIG. 6 is a block diagram showing a technical architecture of any one the communication devices 1, 2.

The technical architecture includes a processor 322 (which may be referred to as a central processor unit or CPU) that is in communication with memory devices including secondary storage 324 (such as disk drives or memory cards), read only memory (ROM) 326, random access memory (RAM) 328. The processor 322 may be implemented as one or more CPU chips. The technical architecture further comprises input/output (I/O) devices 330, and network connectivity devices 332.

The I/O devices comprise a user interface (UI) 330a, a camera 330b and a geolocation module 330c. The UI 330a may comprise a touch screen, keyboard, keypad or other known input device. The camera 330b allows a user to capture images and save the captured images in electronic form. The geolocation module 330c is operable to determine the geolocation of the communication device using signals from, for example global positioning system (GPS) satellites.

The secondary storage 324 is typically comprised of a memory card or other storage device and is used for non-volatile storage of data and as an over-flow data storage device if RAM 328 is not large enough to hold all working data. Secondary storage 324 may be used to store programs which are loaded into RAM 328 when such programs are selected for execution.

In this embodiment, the secondary storage 324 has an order generation component 324a, comprising non-transitory instructions operative by the processor 322 to perform various operations of the method of the present disclosure. The ROM 326 is used to store instructions and perhaps data which are read during program execution. The secondary storage 324, the RAM 328, and/or the ROM 326 may be referred to in some contexts as computer readable storage media and/or non-transitory computer readable media.

The network connectivity devices 332 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 332 may enable the processor 322 to communicate with the Internet or one or more intranets. With such a network connection, it is contemplated that the processor 322 might receive information from the network, or might output information to the network in the course of performing the above-described method operations. Such information, which is often represented as a sequence of instructions to be executed using processor 322, may be received from and outputted to the network, for example, in the form of a computer data signal embodied in a carrier wave.

The processor 322 executes instructions, codes, computer programs, scripts which it accesses from hard disk, floppy disk, optical disk (these various disk based systems may all be considered secondary storage 324), flash drive, ROM 326, RAM 328, or the network connectivity devices 332. While only one processor 322 is shown, multiple processors may be present. Thus, while instructions may be discussed as executed by a processor, the instructions may be executed simultaneously, serially, or otherwise executed by one or multiple processors.

Whilst the foregoing description has described exemplary embodiments, it will be understood by those skilled in the art that many variations of the embodiment can be made within the scope and spirit of the present disclosure.

For example, although as described above, the payment transfer API 62 is only activated in step 106 or 112, and implements the entire payment process at that time, it is alternatively possible in the case that answer in step 104 was "no" for the API to be activated earlier (for example, following step 110) to instruct the issuer server 4 to debit the payment sum (plus any service charge) to the payment account of the sender. That is, during the time-slot chosen by the sender, the API 63 would have only to arrange for the payment to be transmitted to the recipient's payment account (and optionally for any additional reward to be sent to the sender).

With that said, it should be appreciated that one or more aspects of the present disclosure transform a general-purpose computing device into a special-purpose computing device when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method performed by a server of a peer-to-peer (P2P) network, for use in smoothing traffic on the P2P network, the method comprising:

accessing, by a server of a P2P network, a database including historical data describing traffic on the P2P network, the traffic including previous payments;

segmenting a future time period into a plurality of future time-slots and, based on the historical data, determining, by the server, for each of the plurality of future time-slots, an estimate of future traffic on the P2P network, the future traffic including a number of future payments the server will have to perform in the future time-slot;

based on said estimates, assigning, by the server, to at least one of the plurality of future time-slots, an incentive;

receiving, by the server, from a communication device associated with a payment sender, a request to make a payment from a first payment account maintained by an issuer and associated with the payment sender, to a payment recipient, said payment recipient associated with a second payment account maintained by an acquirer;

in response to the request, presenting, by the server, to the communication device associated with the payment sender, the at least one future time-slot to which the incentive was assigned;

receiving, by the server, from the communication device associated with the payment sender, a selection of a future time-slot from the at least one presented future time-slot;

in response to the selection, entering, by the server, the payment to the second payment account into the selected future time-slot in a scheduling database, the scheduling database including scheduling data for a plurality of different payments;

based on the scheduling data, determining, by the server, whether a present time-slot is the future time-slot into which the payment to the second account is scheduled; and when the present time-slot is the future time-slot into which the payment to the second account is scheduled, communicating, by the server, with at least one of the issuer and acquirer, to cause the payment to the second payment account within the selected time-slot, whereby the server is enabled to smooth traffic on the P2P network over time, thereby reducing computation resource requirements of the server at peak times.

2. The computer implemented method according to claim 1, further comprising:

upon receiving said request, transmitting to the communication device associated with the payment sender a query of whether the payment to the second account is urgent, and receiving from the payment sender a response to the query; and when the response to the query is negative, presenting, by the server, to the communication device associated with the payment sender, the at least one future time-slot to which the incentive was assigned.

3. The method according to claim 1, wherein the plurality of future time-slots are successive time-slots; and wherein determining whether the present-time slot is the future time-slot into which the payment to the second account is scheduled includes determining, by the server, in each of the successive time-slots whether a present time-slot is the future time-slot into which the payment to the sender is scheduled.

4. The method according to claim 1, wherein, for the at least one future time-slot to which the incentive is assigned, the incentive is a reward, the reward being higher if the estimated number of payments the server will have to perform in the at least one future time-slot is lower.

5. The method according to claim 1, wherein determining, for each of the plurality of future time-slots, the estimate of future traffic on the P2P network includes:

using said historical data to estimate, for the future time period including the future time-slots, a corresponding estimate of the number of payments the server will have to perform during the future time period; and deriving said estimate of the number of payments the server will have to perform during each future time-slot by partitioning among the future time-slots the estimated number of payments the computer will have to perform during the future time period.

6. The method according to claim 5, wherein the historical data describing the traffic on the P2P network, including the previous payments, includes at least one of:

data indicative of a daily trend in a number of payments the server is requested to perform;

data indicative of a monthly trend in the number of payments the server is requested to perform; and/or data indicative of an annual trend in the number of payments the server is requested to perform.

7. The method according to claim 1, further comprising, after receiving the selection of the future time slot from the at least one presented future time-slot:

increasing the estimated number of payments the server will have to perform in the selected future time-slot; and for at least one of the plurality of future time-slots, updating an incentive assigned thereto.

8. The method according to claim 1, wherein the request to make the payment to the payment recipient includes:

payment account data including data sufficient to identify the issuer, and data sufficient to identify, at least to the issuer, the payment account of the payment sender; and contact data of the payment recipient;

wherein the method further comprises contacting the payment recipient using the contact data, and receiving, from the payment recipient, payment account data comprising data sufficient to identify the acquirer, and data sufficient to identify, at least to the acquirer, the payment account of the payment recipient.

9. A server for use in smoothing traffic on a peer-to-peer (P2P) network, the server comprising a processor and a data storage device storing program instructions, wherein the program instructions, when executed by the processor, cause the processor to:

access a database including historical data describing traffic on the P2P network, the traffic including previous payments;

segment a future time period into a plurality of future time-slots and, based on the historical data, determine, for each of the plurality of future time-slots, an estimate of future traffic on the P2P network, the future traffic on the P2P network including a number of future payments the server will have to perform in the future time-slot;

based on said estimates, assign to at least one of the plurality of future time-slots, an incentive;

receive, from a communication device associated with a payment sender, a request to make a payment from a first payment account maintained by an issuer and associated with the payment sender, to a payment recipient, said payment recipient associated with a second payment account maintained by an acquirer;

in response to the request, present, to the communication device associated with the payment sender, the at least one of the plurality of future time-slots to which the incentive was assigned;

receive, from the communication device associated with the payment sender, a selection of a future time-slot from the presented at least one of the plurality of future time-slots;

in response to the selection, enter the payment to the second payment account into the selected future time-slot in a scheduling database, the scheduling database including scheduling data for a plurality of different payments;

based on the scheduling data, determine whether a present timeslot is the selected future time-slot into which the payment to the second account is scheduled; and when the present time-slot is the selected future time-slot into which the payment to the second account is scheduled, communicate with at least one of the issuer and acquirer, to cause the payment to the second payment account within the selected future time-slot, whereby the server is enabled to smooth traffic on the P2P network over time and reduce computation resource requirements at peak times.

10. The server according to claim 9, wherein the program instructions, when executed by the processor, cause the processor to present to the communication device associated with the sender, for the presented at least one of the plurality of future time-slots to which an incentive was assigned, the corresponding incentive.

11. The server according to claim 9, wherein the program instructions, when executed by the processor, further cause the processor to:

upon receiving said request, transmit to the communication device associated with the payment sender a query of whether the payment to the second account is urgent;

receive from the payment sender a response to the query; and present to the communication device associated with the payment sender, the at least one of the plurality of future time-slots to which the incentive was assigned only when the response to the query is negative.

12. The server according to claim 9, wherein, for the at least one of the plurality of future time-slots to which the incentive is assigned, the incentive is a reward, the reward being higher if the estimated number of payments the server will have to perform in the at least one of the plurality of future time-slots is lower.

13. The server according to claim 9, wherein the program instructions, when executed by the processor, cause the processor, in order to determine, for each of the plurality of future time-slots, the estimate of future traffic on the P2P network, to:

use said historical data to estimate, for the future time period including the future time-slots, a corresponding estimate of the number of payments the server will perform during the future time period; and derive said estimate of the number of payments the server will perform during each future time-slot by partitioning among the future time-slots the estimated number of payments the computer will have to perform during the future time period.

14. The server according to claim 9, wherein the historical data describing the traffic on the P2P network, including the previous payments, includes at least one of:

data indicative of a daily trend in a number of payments the server is requested to perform;

data indicative of a monthly trend in the number of payments the server is requested to perform; and/or data indicative of an annual trend in the number of payments the server is requested to perform.

15. The server according to claim 9, wherein the program instructions, when executed by the processor, further cause the processor to, after receiving the selection of the future time slot from the at least one presented future time-slot:

increase the estimated number of payments the server will have to perform in the selected future time-slot; and for at least one of the plurality of future time-slots, update an incentive assigned thereto.

16. The server according to claim 9, wherein the request to make the payment to the payment recipient includes:

payment account data including data sufficient to identify the issuer, and data sufficient to identify, at least to the issuer, the payment account of the payment sender; and contact data of the payment recipient; and wherein the program instructions, when executed by the processor, further cause the processor to contact the payment recipient using the contact data, and receive, from the payment recipient, payment account data, which includes data sufficient to identify the acquirer and data sufficient to identify, at least to the acquirer, the payment account of the payment recipient.

17. A non-transitory computer readable storage medium including computer-executable instructions, which when executed by a processor, cause the processor to:

access a database including historical data describing traffic on a peer-to-peer (P2P) network, the traffic including previous payments;

segment a future time period into a plurality of future time-slots;

based on the historical data, determine, for each of the plurality of future time-slots, an estimate of future traffic on the P2P network, the future traffic on the P2P network including a number of future payments the server will have to perform in the future time-slot;

based on said estimates, assign to at least one of the plurality of future time-slots, an incentive;

receive, from a communication device associated with a payment sender, a request to make a payment from a first payment account maintained by an issuer and associated with the payment sender, to a payment recipient, said payment recipient associated with a second payment account maintained by an acquirer;

in response to the request, present, to the communication device associated with the payment sender, the at least one of the plurality of future time-slots to which the incentive was assigned;

receive, from the communication device associated with the payment sender, a selection of a future time-slot from the presented at least one of the plurality of future time-slots;

in response to the selection, enter the payment to the second payment account into the selected future time-slot in a scheduling database, the scheduling database including scheduling data for a plurality of different payments;

based on the scheduling data, determine whether a present timeslot is the selected future time-slot into which the payment to the second account is scheduled; and when the present time-slot is the selected future time-slot into which the payment to the second account is scheduled, communicate with at least one of the issuer and acquirer, to cause the payment to the second payment account within the selected future time-slot, whereby the server is enabled to smooth traffic on the P2P network over time and reduce computation resource requirements at peak times.

* * * * *